United States Patent [19]

Burke et al.

[11] Patent Number: 5,333,185

[45] Date of Patent: Jul. 26, 1994

[54] SYSTEM FOR PROCESSING CALLING PARTY INFORMATION FOR INTERNATIONAL COMMUNICATIONS SERVICES

[75] Inventors: Karen B. Burke, Aberdeen; Luis E. Nieto, East Brunswick; I. Grace Tseng, Middletown, all of N.J.

[73] Assignee: AT&T Bell Laboratories, Murray Hill, N.J.

[21] Appl. No.: 709,047

[22] Filed: Jun. 3, 1991

[51] Int. Cl.$^5$ .................. H04M 15/00; H04M 11/00; H04M 1/56; H04M 3/42
[52] U.S. Cl. ............................ 379/127; 379/97; 379/112; 379/142; 379/207; 379/246
[58] Field of Search ................ 379/97, 142, 201, 207, 379/210, 211, 212, 112, 127, 230, 245, 246

[56] References Cited

U.S. PATENT DOCUMENTS

| | | | |
|---|---|---|---|
| 4,191,860 | 3/1980 | Weber | 379/115 |
| 4,555,594 | 11/1985 | Friedes et al. | 379/247 X |
| 4,611,094 | 9/1986 | Asmuth et al. | 379/201 |
| 4,757,267 | 7/1988 | Riskin | 379/201 X |
| 5,136,633 | 8/1992 | Tejada et al. | 379/97 X |
| 5,136,636 | 8/1992 | Wegrzynowicz | 379/97 X |

OTHER PUBLICATIONS

The Bell System Technical Journal, vol. 56, No. 7, Sep. 1977 (Cover sheet and Index only are attached due to voluminous nature of publication–complete text will be furnished if requested.
The Bell System Technical Journal, vol. 61, No. 7, Sep. 1982, "800 Service Using SPC Network Capability", Sheinbein et al, pp.1737–1744.
Engineering and Operations in the Bell System, Second Ed. 1982-1983, Sec. 8.5.5, pp. 292-294.
AT&T Technical Journal, vol. 64, No. 6, Part, 2, "The 5ESS Switching System".
Bellcore, TA-NWT-000394, Issue 3, Nov. 1990, "Switching System Requirements for Interexchange Carrier Interconnection Using the Integrated Services Digital Network User Part" (ISDNUP).
J. Bouche et al., "The Freephone Service", Communication & Transmission by SOTELEC, No. 4, 1986, pp. 91-102.

Primary Examiner—James L. Dwyer
Assistant Examiner—Harry S. Hong
Attorney, Agent, or Firm—Barry H. Freedman

[57] ABSTRACT

A system for delivering originating country information for international toll-free calls to a subscriber includes three separate processes. The country code is extracted from billing and routing data forwarded by the caller's national telephone network to the communication switching system of the destination country of the call, the originating country code is then inserted in either the calling party number or the destination number depending on subscriber's terminating arrangement and finally, the originating country code is delivered to the international toll-free subscriber before the call is completed. Once received by the subscriber, the originating country information can be used to tailor customized services for the foreign caller such as directing calls to attendants fluent in caller's language, or mapping the originating country code to the country name for display to attendants.

14 Claims, 4 Drawing Sheets

FIG. 4

| CPR PARTIAL RECORD LAYOUT | | | |
|---|---|---|---|
| CUSTOMER RECORD ID | SERVICE TYPE | SERVICE FEATURE INDICATOR | AUTOMATIC NUMBER IDENTIFICATION |
| 401 | 402 | 403 | 404 |

SYSTEM FOR PROCESSING CALLING PARTY INFORMATION FOR INTERNATIONAL COMMUNICATIONS SERVICES

TECHNICAL FIELD

This invention relates to a system for processing calling party information relating to international telephone service, and more particularly to a system enabling automatic identification and delivery of information specifying the originating country of an incoming international call.

BACKGROUND OF THE INVENTION

The explosive growth in international long distance telecommunications, coupled with the adoption and implementation of national and international signaling standards, such as Common Channel Signaling 7 Network Interconnect (CCS7 NI), Primary Rate Interface (PRI) and Basic Rate Interface (BRI) of Integrated Services Digital Network (ISDN), have provided the impetus for the creation of a wide variety of sophisticated international communications services offered by IntereXchange Carriers (IXC). These services include database-queried toll-free international calling which allows subscribers to be reached by customers beyond their national borders, usually at no cost to the caller except for a possible local access fee in a limited number of countries.

While toll-free subscribers in the United States have become accustomed to a variety of information forwarding features (such as calling party number forwarding), these features have not heretofore been available in the international arena. Thus, in contrast to the domestic market, international toll-free subscribers have not been able to receive background information regarding calls originating outside of areas that use the North American Numbering Plan. This background information could, for example allow the subscriber to distinguish between the needs of different callers and offer personalized services based upon the country or location of call origination.

One attempt to provide international toll-free subscribers with caller location information, involves the use of the Originating Country Information (OCI) which is part of the billing data exchanged between switching points at call setup time for some international calls. Unfortunately, this approach limits the scope of OCI usage to routing and billing functions exclusively. More importantly, this method lacks the required flexibility needed to permit OCI processing in any standard fashion to enable delivery of that information to the international toll-free subscriber. Thus, at the present time, international toll-free subscribers cannot target specific international market segments or tailor customized services for their foreign callers. This deficiency takes a special significance when one considers cultural and language barrier issues, as well as currency and measurement scale differences between calling and called parties located in different countries.

To remedy this limitation, consideration is being given to utilization of the ISDN User Part (ISUP) signaling standard that has been adopted by the CCITT, to transmit before call completion, OCI or more specifically, Calling Line Identity (CLI) information between switching points. CLI information is comprised of an Originating Country Code (OCC) which is a one to three digit number assigned to each country by CCITT, a trunk code (similar to the area code in the North American Dialing Plan) and a calling party national telephone number. CLI information can be passed between international and local exchange carrier digital switches only over international trunks rigidly adhering to stringent CCITT7 signaling standards that define protocols for the transmission of supervisory and out-of-band signaling information. Thus, even though future deployment of CCS7/ISUP or CCITT7/ISUP-compliant switching and transmission systems in calling and called parties' countries will theoretically allow the called party to receive the CCITT-defined country code and the national telephone number of the calling party, a practical solution to the problem of OCI delivery to the international toll-free subscriber is not at hand in the foreseeable future. This conclusion stems from the fact that global implementation of the ISUP standards requires significant, costly and time-consuming enhancements to the switching and transmission systems of the worldwide telecommunications network. Furthermore, the practical implications of the strictness and stringency of the ISUP standards minimize the benefits of their full scale long-term implementation. The ISUP standards, for example, do not allow the international telecommunications network to forward only the Originating Country Code (OCC) portion of the CLI. Hence, until full CLI information can be forwarded from one country to another, no CLI information will be sent. The need for our invention takes greater importance when it is realized that partial implementation of the ISUP standards is unavailing since the presence of any non-ISUP compliant switches or non-CCITT7 compliant trunks in an international call path will prevent CLI forwarding.

Even if the ISUP standards are globally implemented, the problem of OCI delivery will still persist, because the ISUP standards specify a privacy option that enables the caller to prevent the display to the called party of his/her CLI information. Thus, the exercise of the privacy option by the caller prevents the calling party from receiving not only the calling party number, but also the OCC in the CLI, since only full CLI forwarding is allowed by the standards. Hence, even in the event of the future implementation of the ISUP standards, the problem of circumventing the undesirable side effects of the strictness of the standards still needs to be addressed.

SUMMARY OF THE INVENTION

In accordance with the present invention, a system is disclosed for identifying, forwarding and delivering to a called party, information regarding the originating country of a toll-free international call. The system does not depend on CLI availability nor does it require ISUP implementation. However, it takes advantage of ISUP signaling capability when available, in the destination country of the call. According to the invention, OCI forwarding to the toll-free subscriber involves three separate processes, namely, the identification of the originating country of the call, the formatting of the OCI, and, finally, the delivery of the originating country information to the subscriber.

The identification process is initiated by a foreign caller placing an international toll-free call which is recognized as an outbound international call by the calling party national telephone network based on the number dialed. The caller's national telephone network then routes the call to its International Switching Center (ISC) also called an international gateway switch. As the point of exit for all international calls, the calling party ISC processes the call by converting the number dialed by the caller into billing and routing data to be forwarded to the called party ISC. The billing and routing data typically contains a code identifying the specific international toll-free subscriber to whom the call is destined. Embedded also in the billing and routing data is the CCITT-defined Originating Country Code (OCC) or equivalent information.

Upon receiving the billing and routing data from the calling party ISC, the called party ISC, sometimes called ISC Action Point or ISC/ACP, launches a query on its signaling network to locate the Adjunct Processor (AP) containing the database that stores the Call Processing Record (CPR) for the particular subscriber associated with the call. The ISC/ACP, then forwards the billing and routing data to the AP, which extracts the Originating Country Code (OCC) from the billing and routing data, thereby completing the OCI identification process.

The formatting process of our invention involves placing the Originating Country Code in parts of the routing and signaling message routinely processed by signaling or switching systems of the Interexchange Carrier, Local Exchange Carrier (LEC) and/or subscriber's premises equipment. The following tasks are performed in a sequential manner in this process. The AP queries the database containing the Call Processing Record (CPR) to receive instructions on how to process the call. Information retrieved in the CPR by the database indicates to the AP the type of egress arrangement in use for the Subscriber's Premises Equipment (SPE). Egress arrangements typically fall into two distinct categories, namely, dedicated and switched egress arrangements. In the dedicated egress category, the SPE is directly connected to the Interexchange Carrier network via ISDN or non-ISDN dedicated trunks. Conversely, in the switched egress arrangement, the SPE is connected to the Local Exchange Carrier (LEC) network via either trunks supporting or not supporting ISDN standards or ordinary (POTS) telephone lines. The type of egress arrangement and availability of ISDN signaling services dictate the course of the OCI formatting process.

If ISDN signaling services are available to the subscriber, the AP formulates a destination number and an Automatic Number Identification (ANI) parameter in which it inserts the Originating Country Code (OCC). The AP then forwards the ANI parameter and the destination number to the ISC/ACP which copies the value of the ANI into the Calling Party Number (CPN) parameter of the Initial Address Message (IAM), which is described in more detail below. The ISC/ACP then uses the destination number to forward the CPN parameter in the ISUP IAM, to the IXC terminating toll switch and to route the call to the same switch.

For non-ISDN subscribers, the AP inserts the Originating Country Code (OCC) in the non-exchange portion of the destination number that it forms. In addition, the AP formulates an ANI using the OCC. However, the ANI in this case is not used for OCI delivery purposes. The AP then forwards the destination number to the ISC/ACP which uses it to route the call to the IXC terminating toll switch. At this stage, the OCC is either formatted in the CPN parameter or embedded in the non-exchange portion of the destination number.

The delivery process allows communication of the OCI to the subscriber's premises equipment. If ISDN signaling services are available, the terminating toll switch or the central office switch forwards the CPN parameter to the subscriber using the interworking features of ISUP and ISDN PRI or BRI signaling standard protocol. Alternatively, terminating switches can map the originating country code to the country's name and deliver either one or both, to subscribers with an ISDN connection. For non-ISDN customers, the country code is forwarded to the subscriber in the destination number, using a standard signaling protocol such as the ground start/loop start protocol.

Once the Originating Country Information (OCI) is received by the SPE or station set, it can be used by the subscriber to tailor customized services for the foreign caller. Personalized services that can be offered include, for example, connecting callers from a given country to specialized attendants fluent in caller's native language and familiar with his/her currency. In addition, a subscriber's PBX can map the originating country code to the country's name for display to attendants, if this function is not already performed in the network. In the case of data calls as opposed to voice calls, traffic can be directed to specialized processors capable of recognizing special characters such as Kanji, Chinese, Korean, Arabic, Greek, Hebrew and Cyrillic, to name a few. Furthermore, subscribers can perform traffic pattern analysis to determine distribution of calls by countries of origin. Other miscellaneous services such as billing, facsimile applications, and security services can also be offered. Finally, immediately after the call is terminated, the terminating toll switch sends a CCS7 message to the ISC/ACP indicating that the Originating Country Information was successfully delivered in order for the ISC/ACP to bill the subscriber for the service.

BRIEF DESCRIPTION OF THE DRAWINGS

The present invention is more readily understood after reading the following detailed description in conjunction with the drawing in which:

FIG. 4 is a layout of some of the fields in the Call Processing Record which is the collective set of information (routines, tables options, active/inactive flags, fields) that provides input data for the adjunct processor to formulate call handling and routing instructions for calls destined to a particular subscriber.

DETAILED DESCRIPTION

Figure 1:
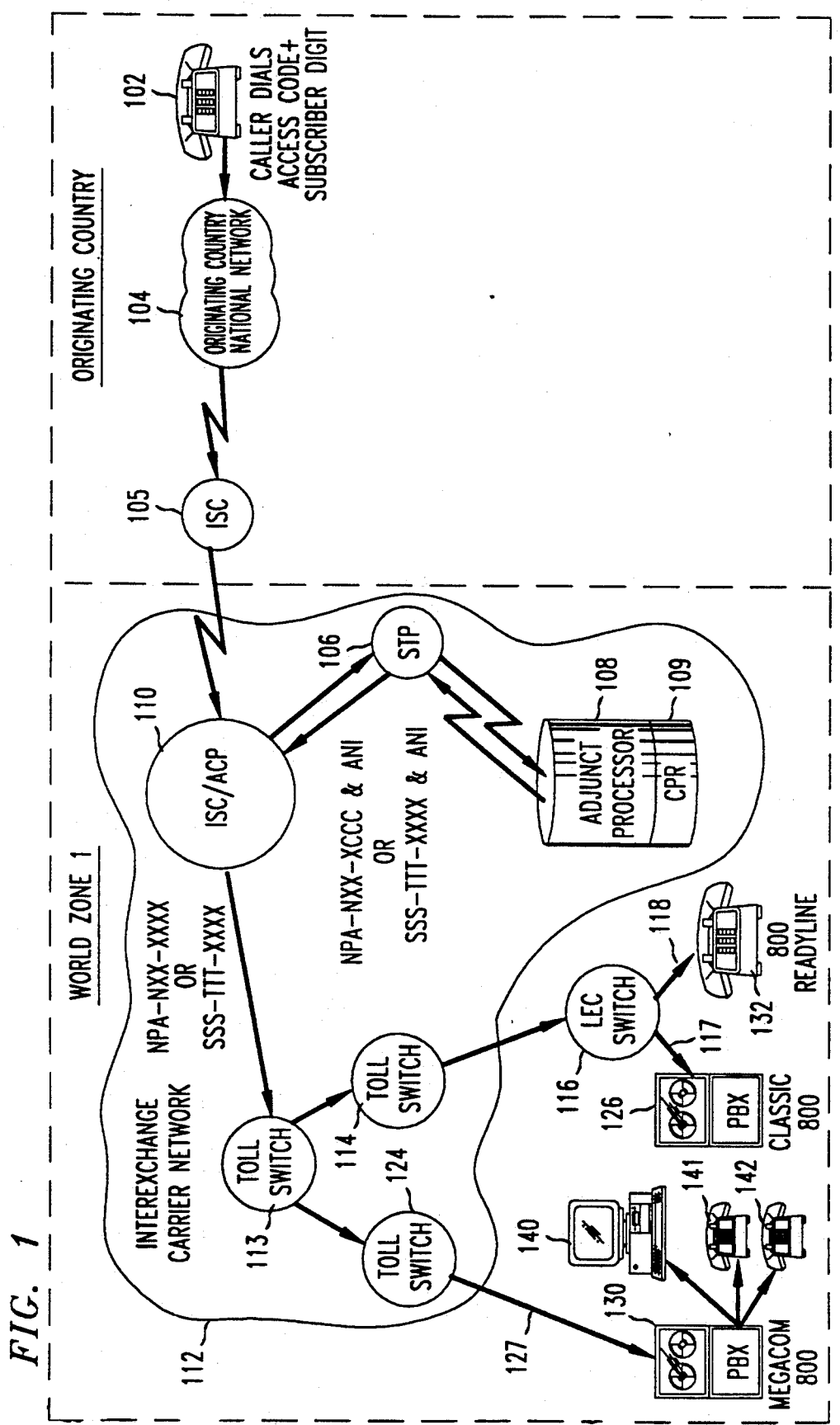
FIG. 1 shows in block diagram form a configuration for an international telecommunications network designed to deliver originating country information to an international toll-free subscriber in accordance with our invention.

FIG. 1 illustrates our system for utilizing an international network arrangement to deliver originating country information to a toll-free subscriber. The term "subscriber" generally refers to an entity that requested the international toll-free service from its national IXC, and ordinarily pays for the call. The international network in FIG. 1 spans at least two countries: for example, a destination country in World Zone I which includes all the countries served by the North American Dialing Plan and an originating country located outside of World Zone 1. The set of originating and destination countries chosen for FIG. 1 does not preclude our invention from being applicable to different sets of originating and destination countries. In FIG. 1, station set 102 located in the originating country, is shown connected to the telephone network 104 of that country. Network 104 is served by the International Switching Center (ISC) 105 which is the point of egress for all outbound international calls from the originating country. FIG. 1 also discloses International Switching Center Action Point (ISC/ACP) 110 located in the destination country in World Zone 1. ISC/ACP 110 performs two primary functions, namely, it operates as the point of entry for all international traffic to be switched on interexchange carrier network 112 and it serves as the access point to the Common Channel Signaling network for international calls. U.S. Pat. No. 4,611,094 issued on Sep. 9, 1986 to R. L. Asmuth, et al. provides a general description of ISC/ACP 110. The Common Channel Signaling network mentioned above is a packet switching network used to exchange call handling messages between processor-driven switching systems according to a specific protocol such as CCS7 or CCS7 ISUP. The signaling network is composed of a plurality of interconnected nodes. However, for the sake of simplicity, the signaling network is represented in FIG. 1 by a single Signal Transfer Point (STP) 106. The features and functionality of an STP are described in the book "Engineering and Operations in the Bell System", Second Edition, published by AT&T Bell Laboratories, at pages 292 through 294. In addition, a detailed description of CCS7 ISDN User Part standards can be found in ANSI document T1.113-1988 or the BellCore document TA-NWT-000394 titled "Switching Systems Requirements for Interexchange Carrier Interconnection Using the ISDN User Part".

The configuration in FIG. 1 also shows adjunct processor 108 connected to STP 106. Adjunct processor 108 consists of a computer system with disk storage which receives routing data from the signaling network. AP 108 runs standard database management system software to retrieve and process call handling instructions for a specific subscriber based on a set of stored parameters. Collectively, these parameters are known as a Call Processing Record (CPR), such as CPR 109 of FIG. 1. AP 108 may be implemented as a Network Control Point (NCP) which is a processor-controlled centralized data base facility performing all the functions described above. The operation of an NCP is described, for example, in the D. Sheinbein, et al., article on pp. 1737-1744 of *Bell System Technical Journal* (BSTJ), September, 1982, Volume 61, No. 7, Part 3. Finally, FIG. 1 depicts various carrier switches such as toll switch 124, toll switch 114, and LEC switch 116. These switches are software-driven, processor-controlled telephone systems designed to route calls either from one switch to another or to subscriber premises equipment such as PBX 130, PBX 126 or telephone set 132. A well-known LEC switch is the AT&T No. 5ESS which is described in *AT&T Technical Journal*, Vol. 64, No. 6, part 2, pp. 1305-1564, July/August, 1985. A toll switch may be implemented using the AT&T No. 4ESS, whose features and functionality are explained in great detail in *Bell System Technical Journal* (BSTJ), Vol. 56, No. 7, pp. 1015-1320, September, 1977.

The components in FIG. 1 constitute the hardware and software platform on which the operational features of our invention are built. Thus, in the course of the disclosure of this invention, a high level explanation of their functionality or internal architecture is provided for the purpose of a comprehensive and thorough description of our invention. However, persons skilled in the art will understand that the specific embodiment in FIG. 1 can be altered in numerous ways and nevertheless be used to implement our invention.

As mentioned above, Call Processing Record (CPR) 109 in FIG. 1 consists of a set of information which includes routines and subroutines logic, table options, fields and active/inactive flags. For simplicity purposes, a subset of the fields most relevant to our invention is provided in FIG. 4. Customer Record Identification 401 uniquely identifies a subscriber within the database system. As its name indicates, service type field 402 points to the type of service requested by the subscriber. For an AT&T subscriber, service type 402 will indicate whether the subscriber requested any of the following services, namely, Advanced 800, Inbound International 800, Outbound International 800, MEGACOM 800, or AT&T 800 READYLINE. Service Feature Indicator field 403 is used to determine any special features requested by the subscriber, such as Calling Party Number delivery, Dialed Number Identification Services, etc. ANI 404 provides a field included in the billing instructions passed by the adjunct processor to the ISC/ACP. In prior art systems, this field is ordinarily populated by the adjunct processor with the calling party number for domestic toll-free calls or the country code for international toll-free calls.

I. Originating Country Code Identification And Formatting

With continued reference to FIG. 1., a caller outside of World Zone 1, at telephone set 102, dials an international toll-free number destined to a called party in World Zone 1. The dialed number identifies the call to originating country national network 104, as a toll-free international call. The dialed number typically consists of a) a toll-free access code assigned by the national telephone regulating body, b) a certain number of digits identifying the international InterXchange Carrier (IXC) such as AT&T, selected by the called party or subscriber, and c) five to seven digits specifying the particular subscriber to whom the call is destined. As for all outbound international communications services, the call placed by the calling party is automatically forwarded by originating country national network 104 to ISC 105, which screens the call for validity and processes it by converting the dialed number received from the caller to a network routing number. The latter number consists of a three-digit code whose purpose is to alert ISC/ACP 110 in the destination country that the incoming call is an international toll-free call. In addition, the network routing number forwarded by ISC 105 contains a five-digit code identifying the subscriber in the destination country and a three-digit code specifying the originating country of the call, typically used only for billing and routing purposes. ISC/ACP 110 forwards the network routing number, including the originating country code, to Signal Transfer Point (STP) 106 which uses the five-digit subscriber code to locate the appropriate adjunct processor such as AP 108. Referring still to FIG. 1, AP 108 extracts the three-digit originating country code from the network routing number forwarded by ISC/ACP 110. In addition, AP 108 queries its database to retrieve the particular Call Processing Record such as (CPR) 109 matching the subscriber's five-digit code.

As mentioned above in our description of the fields in FIG. 4, Service Indicator Feature 403 in CPR 109 indicates to AP 108 the features requested by the subscriber and the type of egress arrangements in place for the subscriber's premises equipment. Based on these parameters and the originating country of the call, AP 108 then devises routing and billing instructions to be forwarded to ISC/ACP 110. The formulation of the billing instructions consists of populating the CPR Automatic Number Identification (ANI) field 404 of FIG. 4 with the three digit originating country code and zeros in the format CCC-000-0000, where "CCC" represents the originating country code. If the originating country code is a one-digit or two-digit number, the CCC portion of ANI 404 may contain leading zeros. The billing instructions also contain generic commands directing ISC/ACP 110 to create an accounting or billing record for the call based on the rates fixed for the country indicated in the originating country code. The routing instructions by contrast are ordinarily comprised of either an NPA-NXX-XXXX number from the North American Dialing Plan or an Interexchange Carrier's internal routing number, sometimes called an Action Point Number (APN), used to route the call from IXC network 112 directly to the subscriber's premises equipment. The choice of one of these routing methods and the manner in which the originating country information and the call are ultimately routed to the international toll-free service subscriber, depends on how the subscriber's premises equipment (such as PBX 130 or station set 132) is connected to IXC 112.

II. Originating Country Information Delivery

Two common methods are typically used to connect a PBX or telephone set to interexchange carrier network 112, namely, a switched egress arrangement and a dedicated egress connection. In a switched egress arrangement, a PBX, such as PBX 126 is connected to the Local Exchange Carrier (LEC) switching network 116, through dedicated facilities such as high speed private lines 117. A switched egress arrangement also covers the familiar configuration of a telephone set such as set 132 connected via ordinary telephone (POTS) lines such as link 118 to Local Exchange Carrier switch 116. AT&T 800 READYLINE service and AT&T CLASSIC 800 service are well-known examples of switched egress arrangements with single lines and dedicated lines, respectively. By contrast, PBX 130 configured in a dedicated egress arrangement, is connected via dedicated private line 127 to toll switch 124. AT&T MEGACOM 800 service is a good example of a toll-free service using a dedicated egress arrangement.

Figure 2:
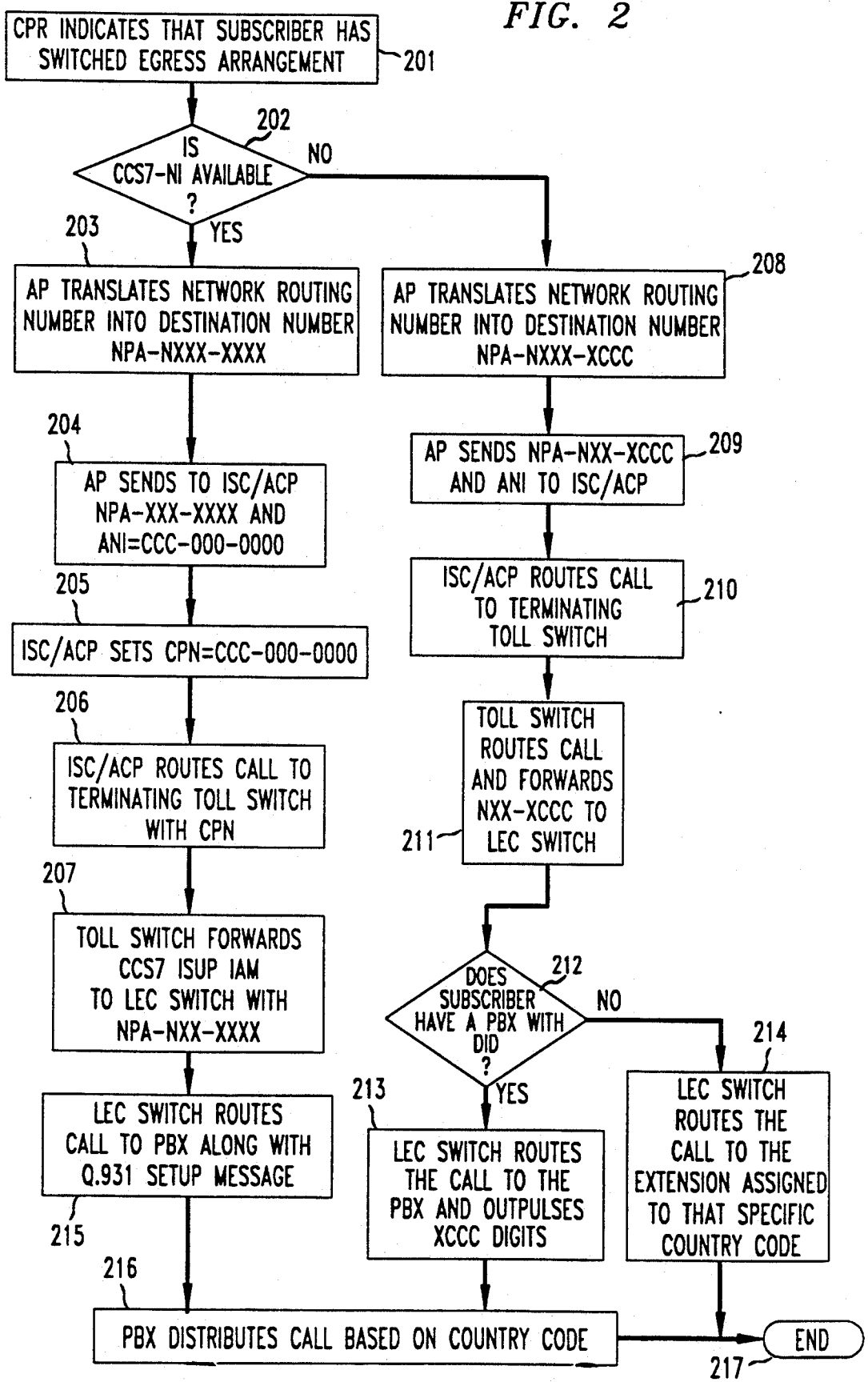
FIGS. 2 and 3 represent flow diagrams of call processing instructions executed by the database system, the ISC/ACP and other system components of FIG. 1 for routing calls within an international telecommunications network and for delivering originating country information to the subscriber in accordance with our invention.

FIG. 2 illustrates a method for delivering Originating Country Information (OCI) to a switched egress subscriber in accordance with our invention. The call processing and originating country information formatting steps are performed by AP 108 and ISC/ACP 110 of FIG. 1, while the switching steps and originating country information delivery steps are effectuated by the other components of interexchange carrier network 112 in FIG. 1 and the LEC network represented in FIG. 1 for simplicity purposes by LEC switch 116. With reference to FIG. 2, the process begins in step 201, in which the contents of service type field 402 in Call Processing Record (CPR) 109 is used in AP 108 to determine that the subscriber has a switched egress arrangement based on the features provisioned for the subscriber. By way of example, if service type field 402 indicates that the subscriber has 800 READYLINE type of service, AP 108 then determines that the subscriber has a switched egress arrangement. Information in Service Feature Indicator field 403 of CPR 109, in step 202, also determines for AP 108 whether CCS7-NI services are offered by the LEC switch to which the SPE is connected. CCS7-NI availability is determined based on whether or not a switched egress subscriber requested the calling party number delivery feature. Availability or lack of CCS7-NI triggers two separate OCI delivery methods, using different signaling protocols.

In the first method, where CCS7-NI is not available (meaning the switched egress subscriber did not request calling party number delivery), AP 108, in step 208, translates the network routing information received from STP 106 into a destination number of the form NPA-NXX-XCCC, where CCC represents the originating country code of the caller. This scheme of formulating a destination number is advantageous because the standard format of a destination number can b used to transport the originating country code which would not otherwise be available for delivery to the subscriber. AP 108 proceeds in step 209 to forward the NPA-NXX-XCCC number and ANI 404 to ISC/ACP 110. The latter, in step 210, routes the call to terminating toll switch 114, which in turn routes it to the LEC switch in step 211, after removing the NPA portion of the destination number. The LEC switch, in step 212, performs a test to determine whether the subscriber's premises equipment is a PBX with Direct Inward Dialing (DID) service or a regular station set. This test is conducted by a table lookup in the LEC switch comparing specific exchange numbers with trunk subgroup numbers. If the subscriber does not have a PBX with DID, terminating LEC switch 116, using a standard signaling protocol, routes the call to subscriber's telephone set 132 with the extension XCCC. If the subscriber is served by an advanced Local Exchange Carrier (LEC) switch, such as the AT&T 5ESS switch, the call can be forwarded to another set in the event that the first telephone set 132 is busy or disabled. In such event, the distinctive ringing feature or other similar functional feature of the advanced LEC switch can be used to indicate to the called party the originating country of the call.

If the subscriber has a PBX and Direct Inward Dialing (DID) service from the LEC, terminating LEC switch 116 in step 213, routes the call to PBX 126 and outpulses to that PBX the XCCC portion of the destination number received from toll switch 114, using a standard signaling protocol. PBX 126, in step 216, distributes the call to attendants specializing in the originating country of the caller.

Notice that in the first method described above, the XCCC number outpulsed by LEC switch 116 to PBX 126 or corresponding to the extension of telephone set 132, is used in this disclosure for illustrative purposes. The XCCC digits can be any number corresponding to a specific country code, so long as there is agreement on that specific number between the Interexchange Carrier and the subscriber. AP 108 in this case, goes through the additional step of mapping the Originating Country Code to the specific telephone number requested by the subscriber, in its formulation of the destination number.

Conversely, the subscriber's PBX identifies the digits outpulsed by LEC switch 116 with calls originated from a specific country. By way of example, let us assume that a subscriber wants all calls from country Z to be directed to telephone set 132 in the United States with the number 202-234-5678. In this case, CPR 109 stores 202-234-5678 in its routing number parameter. In addition, AP 108 upon receiving a network routing number from ISC/ACP 110 with the originating country code for country Z, formulates a routing number matching the subscriber provided number. Call routing and completion then follows all of the steps described above. Alternatively, if a subscriber wants all calls originating from country Y to be sent to PBX 126 with digits 1234, AP 108 will formulate a routing number NPA-NXX-1234 whenever an international toll-free call originates from country Y. LEC switch 116 will outpulse 1234 to the PBX in accordance with the steps described above.

In the second method, where CCS7-NI is available, full advantage is taken of ISUP's powerful signaling capabilities and the interworking features of CCS7 ISUP with ISDN PRI signaling protocol. Referring still to FIG. 2, in step 203, AP 108 translates the network routing number received from ISC/ACP 110 into a destination number of the form NPA-NXX-XXXX. In addition, in step 204, AP 108 sends back ANI 404 in the format CCC-000-0000 and the destination number NPA-NXX-XXXX to ISC/ACP 110. The latter, in step 205, copies the contents of ANI 404 into the address digits field of the Calling Party Number parameter. The CPN parameter then becomes equal to CCC-000-0000. Furthermore, ISC/ACP 110, in the same step, populates the presentation indicator field in the CPN parameter with a code indicating that presentation of the CPN parameter is allowed to be displayed to the called party. This step is implemented to allow the standard format of a Calling Party Number to transport the Originating Country Code which would otherwise not be available for delivery to the subscriber. ISC/ACP 110 proceeds, in step 206, to map the CPN parameter into the corresponding field of the CCS7 ISUP Initial Address Message (IAM), to forward the IAM and route the call at the same time, to terminating toll switch 124.

It is to be noted here that an Initial Address Message (IAM) consists of a set of call handling and user information parameters used to transmit signaling information between switching points prior to the establishment of a call. It ordinarily consists of Calling Party Number, Called Party Number, Carrier Selection, Service Code and other user-related types of information. For additional information on IAM, see BellCore document TA-NWT-000394 titled "Switching Systems Requirements for Interexchange Carrier Interconnection Using the ISDN User Part."

In step 207, terminating toll switch 114 strips the NPA portion of the destination number and forwards CCS7 ISUP IAM to LEC switch 116 with the destination number data in the form NXX-XXXX. LEC switch 116, in step 215, takes advantage of the interworking features of CCS7 ISUP and ISDN PRI/BRI signaling protocols, which provide a logical mapping of signaling data between the IAM of the CCS7 standard to the Q.931 Information Elements of the ISDN standard. Since the subfields of the CPN parameter in the IAM may not always map to their equivalent in the CPN of the Q.931 SETUP message, LEC switch 116, in step 215 unpacks the CPN parameter from the IAM and maps it into the corresponding field in the Information Elements (IE) set of fields of the Q.931 SETUP Message. LEC switch 116, in the same step, completes the call and delivers the CPN to PBX 126 using the ISDN PRI signaling protocol. As is generally known to persons skilled in the art, while there is compatibility between CCS7 ISUP and ISDN PRI signaling protocols, a mapping of the fields in the IAM to the Q.931 Information Elements (IE) set of fields of the SETUP message is needed for passing information from LEC switch 116 to PBX 126 using PRI out-of-band signaling capability. Thus, LEC switch 116 can perform a mapping of the originating country code in the CPN parameter to the caller's country name, and place the name in one of the IE fields of the Q.931 SETUP message to be passed to PBX 126. PBX 126, in step 216 distributes the call to the appropriate attendant based on the originating country code in the CPN parameter or the country name in the IE field.

Figure 3:
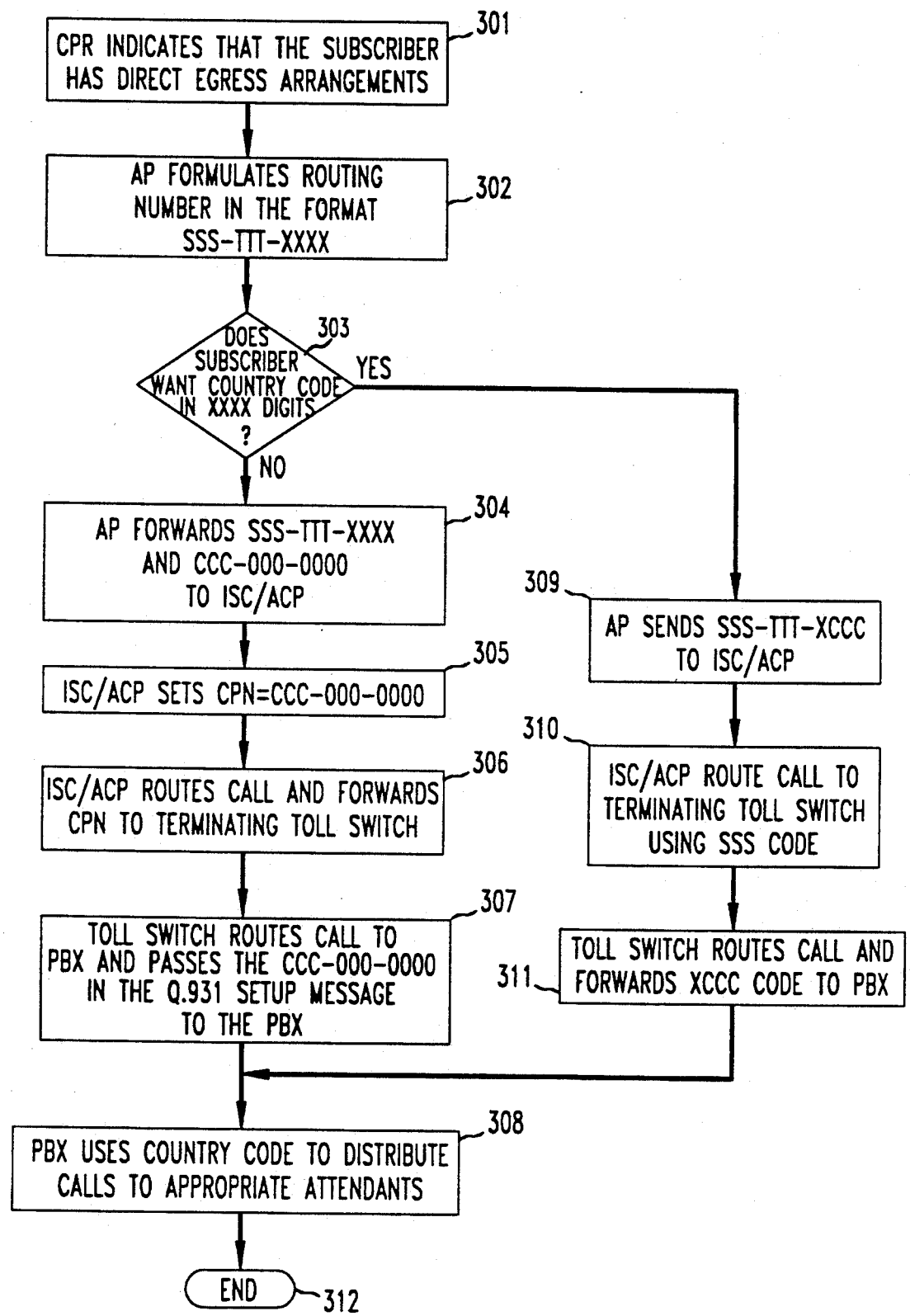

FIG. 3 outlines an illustrative step-by-step method for delivering OCI to a dedicated egress subscriber. With reference to FIG. 3, the call processing record (CPR) 109, in step 301, indicates to AP 108 that the subscriber has a dedicated egress arrangement. As indicated above, this determination is predicated on the set of features requested by the subscriber and the content of service feature indicator field 403 of CPR 109. Indication of dedicated egress arrangement impels AP 108, in step 302 to translate the network routing number received from ISC/ACP 110 into an internal routing number identifiable only to switches on the interexchange carrier's network. The routing number formulated by AP 108 is called an Action Point Number (APN) and is of the form SSS-TTT-XXXX. The SSS digits represent the terminating toll switch, while the TTT digits of the APN identify the subgroup number of the direct egress trunk from the SPE to the terminating toll switch. What the XXXX digits represent depends on whether the subscriber requested Dialed Number Identification Services (DNIS) features or/and wants the originating country code to be passed in that number. DNIS is a tariffed service offered by AT&T that permits a subscriber with multiple domestic toll-free numbers in the same routing arrangement to identify the specific toll-free number which was dialed by the calling party. With continued reference to FIG. 3, CPR 109 in step 303, determines whether the subscriber wants the OCI to be passed in the destination number. This test is predicated on whether the subscriber requested ISDN signaling services and DNIS features for toll-free international calls. The absence of ISDN signaling services automatically forces the country code to be passed in the XXXX portion of the destination number. However, a subscriber with ISDN services may still want to have the country code forwarded in the XXXX digits of the destination number. If the subscriber does not want the originating country code to be passed in the XXXX digits, AP 108, in step 304, populates the first three bytes of the ANI field 404 shown in the CPR of FIG. 4, with the country code extracted from the network routing number, and right justifies the rest of the information in ANI field 404 with zeros in the form CCC-000-00000. AP 108 proceeds in the same step to forward the APN and the contents of ANI 404 to ISC/ACP 110. Upon receiving the APN and ANI 404, ISC/ACP 110, in step 305 copies the contents of ANI 404 into the Calling Party Number (CPN) parameter of the ISUP Initial Address Message. In addition, ISC/ACP 110 sets the privacy indicator in the CPN parameter to "presentation allowed". Step 305 is implemented to allow the standard format of a Calling Party Number parameter to be used for transport of the Originating Country Code which would not otherwise be available for delivery to the subscriber. ISC/ACP 110 proceeds in step 306 to route the call and forward CCS7 ISUP IAM to terminating toll switch 124. The latter switch in turn maps the CCC-000-0000 value of the CPN parameter into the corresponding field of the Information Elements (IE) of the Q.931 SETUP Message. Toll switch 124 then, in step 307, routes the call to the Subscriber's Premises Equipment (SPE) and passes the CCC-000-0000 in the Q.931 IE to the SPE using the ISDN PRI signaling protocol. Alternatively, terminating toll switch 124 can map the originating country code in the CPN parameter to the country's name, place it in one of the fields of the IE and pass it to PBX 130. PBX 130, in step 308 distributes the call to the appropriate attendant 141 or 142, based on the originating country code or originating country name. For example, calls originated from Japan can be automatically routed to station set 141 manned by an an attendant fluent in Japanese. Similarly, calls from all Spanish speaking countries of Latin America can be routed to station set 142 manned by attendants fluent in Spanish. The OCI feature in the case just described does not preclude the subscriber from using the DNIS capability for other customized features. However, it does require the customer to subscribe to ISDN PRI services to benefit from these OCI features and DNIS capability.

If the customer does not subscribe to ISDN PRI services or prefers to have the country code as part of DNIS capability, AP 108 receives an indication of this condition from CPR 109 in step 303. AP 108 then takes the originating country code extracted from the network routing number, and places it in the last three bytes of the destination number. The APN then is in the format SSS-TTT-XCCC, where CCC is the originating country code, TTT is the trunk subgroup number connecting PBX 130 to toll switch 124 and SSS is a number identifying toll switch 124. Once again, this formulation of the destination number allows the standard format of the destination number to be used to transport the originating country code which would not otherwise be available for delivery to the subscriber. AP 108 proceeds in step 309, to forward the APN to ISC/ACP 110. The latter routes the call, in step 310 to terminating toll switch 124 based on the SSS digits. In step 311, terminating toll switch 124 routes the call to PBX 130 and outpulses the XCCC digits to the PBX, using a ground start or loop start signaling protocol. PBX 130 in step 308 uses the country code to distribute calls to attendants in the same manner described above.

III. Originating Country Code Processing

Once the country code is received by a terminating switch such as a toll switch 114 or 124, PBX 126 or 130 or LEC switch 116, it can be used to pass various kinds of useful information to the end user or to provide customized services to the subscriber. As a practical matter, all telemarketing applications predicated on Calling Party Number delivery can be adapted for the OCI delivery feature. Of special interest are two OCI-specific types of services that can be offered, namely, network-based services using the processing capability of the terminating switch, and premises-based services which exploit the processing resources of a PBX. These are both discussed below.

IV. Network-Based Services

For a dedicated egress location with an ISDN PRI interface, terminating toll switch 114 or 124 can map the country code to the corresponding country name. The country's name can then be forwarded in the Information Element (IE) field of the Q.931 message to PBX 126 or 130. The attendant receiving the call can answer it, if s/he is qualified, or transfer the call to an attendant with the appropriate skills set to handle the call. Alternatively, PBX 126 or 130 can be programmed to forward calls to specific attendants at terminals 141 and 142 in FIG. 1, based on the country name. Similar functionality can be provided by LEC switch 116 to PBX 126 or station set 132 is PBX 126 has an ISDN PRI interface to LEC switch 116 or if station set 132 has a display unit and a BRI interface to LEC switch 116. LEC switch 116 can also direct calls from certain countries to home numbers of telecommuters or automatically bridge in attendants of language translator services such as the AT&T Language Line. The latter service is provided using the advanced features of LEC switch 116 such as conference calling.

For non-ISDN locations with dedicated or switched egress arrangement, the translation from country code to associated country name can only be performed in the PBX since the terminating toll switch outpulses just the XCCC digits to the PBX.

V. Premises-based Services

Regardless of the signaling standards (ISDN or ground-start/loop start) used to forward the OCI to a PBX, once the OCI is received, a plurality of customized services can be offered by that PBX. A synopsis of the various types of services that can be offered is provided below. PBX 130 or PBX 126 in FIG. 1 can map the originating country code to the country name for display to attendants fluent in the language of the caller using well-known call vectoring or automatic call distribution techniques. The displayed country name can also be simultaneously forwarded to processor 140 in FIG. 1 to retrieve information screens on that specific country such as updated currency exchange rate, type of credit cards to accept, etc. In the case of data calls as opposed to voice calls, the PBX can direct data calls to specialized processors capable of recognizing non-latin characters. For example, data calls from Japan could be directed by PBX 130 in FIG. 1 to processor 140 capable of recognizing Kanji-based characters. PBX 130 or PBX 126 can also route a call from a specific country to audio response units or call prompter devices programmed in the language of the caller. Finally, PBX 130 or PBX 126 can use the OCI to offer services such as traffic pattern analysis of incoming calls by country of origin, and selective fraud prevention whereby customers from specific countries are subject to additional scrutiny based on credit and/or fraud history.

The above description is to be construed as only an illustrative embodiment of our invention. One skilled in the art can conceive of alternative arrangements involving other international telecommunications services such as virtual private networks or non-toll-free inbound international calls that may use similar or other routing techniques to deliver originating country information to subscribers without any deviation from the fundamental principles or the scope of this invention.

We claim:

1. A method of delivering originating country code information associated with an international call initiated by a caller in an originating country and destined for a called party in a destination country wherein said method comprises the steps of:
   receiving routing information associated with the call;
   extracting from said routing information an originating country code;
   formatting said originating country code in a field reserved for automatic number identification data; and
   forwarding said originating country code to said called party.

2. The method of claim 1 further including the step of:
   translating said originating country code to an equivalent country name for display to said called party.

3. The method of claim 1, wherein said call is completed to a communication switching system which distributes the call to a selected one of a plurality of stations as a function of the value of said originating country code.

4. The method of claim 1, wherein said call is connected to a processor that generates a plurality of alphabetical and numerical symbols wherein selection of a set of said alphabetical and numerical symbols is a function of the value of said originating country code.

5. The method of claim 1, wherein said originating country code is forwarded to a database system storing a plurality of data on a plurality of countries wherein said data for one of said countries is selected for retrieval as a function of the value of said originating country code.

6. The method of claim 1 wherein a counter is accumulated for each call in which said originating country code is delivered to said called party for the purpose of billing said called party for the delivery of the originating country code.

7. A system for delivering originating country code information associated with an international call initiated by a caller in an originating country and destined for a called party in a destination country wherein said system comprises
   means for receiving routing information associated with the call;
   means for extracting from said routing information an originating country code;
   means for formatting said originating country code in a field reserved for automatic number identification data; and
   means for forwarding said originating country code to said called party.

8. The system of claim 7 further including means for translating said originating country code to an equivalent country name for display to said called party.

9. The system of claim 7 wherein said call is completed to a communication switching system which distributes said call to a selected station as a function of the value of said originating country code.

10. The system of claim 7 wherein said call is connected to a processor that generates a plurality of alphabetical and numerical symbols wherein selection of a set of said alphabetical and numerical symbols is a function of the value of said originating country code.

11. The system of claim 7, wherein said said originating country code is forwarded to a database system storing a plurality of data on a plurality of countries and wherein said data for one of said countries is selected for retrieval as a function of the value of said originating country code.

12. The system of claim 7 further comprising means for accumulating a counter for each call in which said country of origin code is delivered to said called party for the purpose of billing said called party for the delivery of the originating country code.

13. Apparatus comprising:
   means for receiving billing and routing data associated with an international call;
   means for deriving from said data a code identifying the country of origination of said call;
   means for replacing some of the digits in a field ordinarily used for automatic number identification (ANI) with digits of said originating country code; and
   means for delivering contents of said field to said called party.

14. The means of claim 13 wherein said information can be gathered from billing and routing data, satellite uplink and downlink identification number, trunk subgroup number, international gateway switch port number and call prompting devices.

* * * * *